US010822278B2

(12) United States Patent
Liang et al.

(10) Patent No.: US 10,822,278 B2
(45) Date of Patent: Nov. 3, 2020

(54) BARIUM TITANATE FOAM CERAMIC/THERMOSETTING RESIN COMPOSITES AND PREPARATION METHOD THEREOF

(71) Applicant: SOOCHOW UNIVERSITY, Suzhou (CN)

(72) Inventors: Guozheng Liang, Suzhou (CN); Longhui Zheng, Suzhou (CN); Aijuan Gu, Suzhou (CN); Pengfei Zhang, Suzhou (CN); Li Yuan, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 169 days.

(21) Appl. No.: 16/068,848

(22) PCT Filed: Nov. 29, 2016

(86) PCT No.: PCT/CN2016/107794
§ 371 (c)(1),
(2) Date: Jul. 9, 2018

(87) PCT Pub. No.: WO2017/121202
PCT Pub. Date: Jul. 20, 2017

(65) Prior Publication Data
US 2019/0016639 A1     Jan. 17, 2019

(30) Foreign Application Priority Data

Jan. 11, 2016   (CN) .......................... 2016 1 0014636

(51) Int. Cl.
*C04B 35/00*        (2006.01)
*C04B 35/468*       (2006.01)
(Continued)

(52) U.S. Cl.
CPC ........ *C04B 35/4682* (2013.01); *C01G 23/006* (2013.01); *C04B 35/6269* (2013.01);
(Continued)

(58) Field of Classification Search
CPC .......................... C04B 38/0625; C04B 41/488
See application file for complete search history.

(56) References Cited

U.S. PATENT DOCUMENTS

| | | | | | |
|---|---|---|---|---|---|
| 4,024,212 | A | * | 5/1977 | Dore .................. | B01D 39/2093 264/44 |
| 6,808,577 | B2 | * | 10/2004 | Miyazaki ............ | H01F 17/0013 106/311 |
| 2009/0263739 | A1 | * | 10/2009 | Sugiura .................. | G03G 9/107 430/111.32 |

FOREIGN PATENT DOCUMENTS

| | | | | | |
|---|---|---|---|---|---|
| CN | 102372499 | | * | 8/2010 | ............. C04B 35/58 |
| CN | 104693688 | A | | 6/2015 | |

(Continued)

OTHER PUBLICATIONS

"Plasticizer." Plasticizer—Wikipedia, the Free Encyclopedia, Dec. 11, 2015, web.archive.org/web/20151211053125/en.wikipedia.org/wiki/Plasticizer. (Year: 2015).*

(Continued)

*Primary Examiner* — Alison L Hindenlang
*Assistant Examiner* — Andrés E. Behrens, Jr.
(74) *Attorney, Agent, or Firm* — SZDC Law P.C.

(57) ABSTRACT

Disclosed are a barium titanate foam ceramic/thermosetting resin composite material and a preparation method therefor. An organic additive is used as an auxiliary; deionized water is used as a solvent; nanometer barium titanate is used as a ceramic raw material; and all of same are mixed and ground so as to form a slurry with a certain solid content. A pre-treated polymer sponge is impregnated into the slurry for slurry coating treatment, and then redundant slurry is (Continued)

removed and the polymer sponge is dried so as to obtain a barium titanate foam ceramic blank, and same is then sintered so as to obtain a barium titanate foam ceramic. A resin, being in a molten state and thermosettable, submerges the pores of the barium titanate foam ceramic, and a barium titanate foam ceramic/thermosetting resin composite material is obtained after a thermosetting treatment.

6 Claims, 4 Drawing Sheets

(51) Int. Cl.
    *C04B 41/83*     (2006.01)
    *C04B 41/48*     (2006.01)
    *C04B 41/00*     (2006.01)
    *C01G 23/00*     (2006.01)
    *C04B 35/626*     (2006.01)
    *C04B 38/06*     (2006.01)
    *C04B 111/00*     (2006.01)

(52) U.S. Cl.
    CPC ........ *C04B 38/0625* (2013.01); *C04B 41/009* (2013.01); *C04B 41/488* (2013.01); *C04B 41/4853* (2013.01); *C04B 41/83* (2013.01); *C01P 2002/34* (2013.01); *C01P 2002/72* (2013.01); *C01P 2004/03* (2013.01); *C04B 2111/00844* (2013.01); *C04B 2235/6028* (2013.01); *C04B 2235/616* (2013.01); *C04B 2235/6562* (2013.01); *C04B 2235/6567* (2013.01); *C04B 2235/77* (2013.01)

(56) References Cited

FOREIGN PATENT DOCUMENTS

| CN | 105419328 A | 3/2016 | | |
|---|---|---|---|---|
| CN | 105541389 A | 5/2016 | | |
| CN | 105622162 A | 6/2016 | | |
| JP | 2001250423 A | 9/2001 | | |
| WO | WO-1992018213 | * | 4/1991 | ........... C04B 35/462 |
| WO | WO-1992018213 A1 | * | 10/1992 | ........... C04B 35/462 |

OTHER PUBLICATIONS

CN-102372499 (Ming) Aug. 2010 (online machine translation), [Retrieved on Feb. 18, 2020]. Retrieved from: Google Patents (Year: 2010).*
Hara, Osamu. Three Bond Technical News. Three Bond, Dec. 20, 1990, web.archive.org/web/20051103141620/www.threebond.co.jp/en/technical/technicalnews/pdf/tech32.pdf. (Year: 1990).*
Zheng et al., "Unique pure barium titanate foams with three-dimensional interconnecting pore channels and their high-k cyanate ester resin composites at very low barium titanate loading", J. Mater. Chem. C, 2016, 4, 10654-10663 (Oct. 18, 2016).

* cited by examiner

BARIUM TITANATE FOAM CERAMIC/THERMOSETTING RESIN COMPOSITES AND PREPARATION METHOD THEREOF

This application is a the national stage of PCT/CN2016/107794, filed on Nov. 29, 2016, which claims priority to Chinese Patent Application No. 201610014636.0, filed Jan. 11, 2016, which is incorporated by reference for all purposes as if fully set forth herein.

FIELD OF THE INVENTION

The present invention relates to a kind of composite and preparation method thereof, and particularly relates to barium titanate foam ceramic/thermosetting resin composites and preparation method thereof.

BACKGROUND OF THE INVENTION

Dielectric ceramic is an important species among high dielectric constant materials, which has been used as a kind of electronic ceramics with high dielectric constant and good ferroelectric, piezoelectric and insulation properties and has played an important role in the field of electronic ceramic industry. However, traditional dielectric ceramics have several disadvantages such as heavy weight, brittleness and rigorous processing conditions, thus limiting their applications in high-power capacitors. So ceramic/polymer composites have been developed. Due to excellent comprehensive performances of high mechanical strength, high dielectric constant and low dielectric loss of barium titanate, which has been combined with different polymers to obtain a variety of barium titanate/polymer composites with high dielectric constant.

However, some studies have found that the dielectric constant is significantly reduced when ceramic was blended with polymer. In order to obtain desired dielectric properties, the ceramic content in composites generally should be higher than 50 vol %. However, this usually leads to poor processing features and difficulty to produce high-quality composites. In addition, a crucial issue is the uneven dispersion of ceramics in polymer, and ceramics tend to form aggregates, consequently, high dielectric properties of ceramics cannot play in the composites, and the mechanical properties of composites are poor.

Up-to-now, two main methods are used to solve above problems. One is improving the dispersion of ceramics by surface treatment, however, this method is not effective in reducing the high content of ceramics. Another route is introducing conductive fillers as a third component, this method can significantly reduce the content of ceramics, however, it also brings high dielectric loss due to the existence of conductive fillers in the composites. Therefore, how to solve above problems and develop ceramic/polymer composites with excellent preparation process and dielectric properties is still a subject with significant value of application.

SUMMARY OF THE INVENTION

The present invention deals with solving problems of existing technologies, and providing a kind of barium titanate foam ceramic/thermosetting resin composites with simple preparation and controllable properties, high dielectric constant and low dielectric loss, and the preparation method thereof.

To achieve above purpose, the present invention adopts the following technical solution:

A preparation method for barium titanate foam ceramic/thermosetting resin composites, which comprises following steps:

(1) by weight, 100 parts of nano barium titanate and 30 to 120 parts of an aqueous solution of organic binder with a concentration of 1 to 15 wt % are sufficiently ground to obtain a slurry A; 10 to 80 parts of an aqueous solution of organic rheological agent with a concentration of 0.5 to 3 wt % are added into the slurry A, and the mixture is sufficiently ground to obtain a slurry B; 20 to 80 parts of an aqueous solution of organic dispersant with a concentration of 0.5 to 3 wt % are added into the slurry B, and the mixture is sufficiently ground to obtain a slurry C; said organic binder is one or more selected from polyvinyl alcohol, carboxymethyl cellulose and methyl cellulose; said organic rheological agent is one or more selected from carboxymethyl cellulose and hydroxyhexyl cellulose; said organic dispersant is one or more selected from polyacrylamide, polyethyleneimine and polyacrylic acid amine;

(2) a polymer sponge having a specification of 15 to 35 PPI is soaked in an aqueous solution of sodium hydroxide with a concentration of 5 to 20 wt %, after heated up to 50 to 75° C., and kept at that temperature for 2 to 6 h, the polymer sponge is taken out and washed with deionized water, following by drying to obtain a polymer sponge D; at room temperature, the polymer sponge D is soaked in an aqueous surfactant solution with a concentration of 0.5 to 3 wt % for 2 to 6 h, then took out and removed the excess surfactant, after dried at 40 to 80° C., a pretreated polymer sponge E is obtained; the polymer of said polymer sponge is selected from polyurethane, polystyrene, or polyvinyl chloride; said surfactant is one or more selected from carboxymethyl cellulose and polyethyleneimine;

(3) the pretreated polymer sponge E is soaked in the slurry C prepared in step (1), and maintained for 1 to 10 min at room temperature, after hanging pulp, the excess slurry in the sponge is removed by extrusion, and the sponge is dried at 40 to 80° C.; repeating processes of hanging pulp and drying for 1 to 7 times, a green body of barium titanate foam ceramics is obtained;

(4) the green body of barium titanate foam ceramics prepared in step (3) is heated from room temperature to 100-300° C. at a rate of 0.5-5° C./min, and then raised to 500-700° C. at a rate of 0.5-5° C./min and maintained at 500-700° C. for 0.5-2 h, after that, continuously heated to 1000-1500° C. at a rate of 2-10° C./min and kept at 1000-1500° C. for 1-5 h, after the furnace is cooled to room temperature, barium titanate foam ceramics is obtained;

(5) a molten and thermocurable resin is poured into the barium titanate foam ceramics prepared in step (4), after the pores of foam ceramic are fully permeated with the resin, by thermocuring and postprocessing, a barium titanate foam ceramic/thermosetting resin composite is obtained.

The average diameter of said nano barium titanate is less than or equal to 100 nm.

The process conditions of thermocuring and postprocessing are consistent with the process conditions of thermocuring and postprocessing of the thermocurable resin being used.

The thermosetting resin is a resin which can be self-cured by heat, or a resin system composed of curing agent and resin which cannot be self-cured by heat. The resin which can be self-cured by heat is one or more selected from bismaleimide resin and cyanate ester resin. The resin which cannot be self-cured by heat is epoxy resin.

The technical solution of the present invention also comprises a kind of barium titanate foam ceramic/thermosetting resin composites obtained by above mentioned preparation method.

The volume percentage of the resin in the composite is from 60% to 90%.

Compared with the prior arts, this invention has following advantages:

1. Different from the existing technology of preparing composites by directly adding ceramic powders into polymer, barium titanate foam ceramics with three-dimensional network structure and interconnecting channels are used as functional fillers in this invention, when the resin is poured into the skeleton of foam ceramics, directly achieving uniform distribution of ceramics in polymer, and simultaneously overcoming the process problems of the existing technology.

2. Different from the existing technology for preparing foam ceramics, inorganic materials are not added or "in situ" formed in the preparation process of this invention, instead, organic additives are used, producing barium titanate foam ceramic with a single chemical composition and pure barium titanate skeleton, the foam ceramic inherits the excellent dielectric properties of barium titanate; in addition, after those barium titanate foam ceramics are treated with sintering at high temperature, and their dielectric performances will be further improved. When the obtained barium titanate foam ceramics are combined with thermosetting resins, the resultant composites show a higher dielectric constant at a low ceramic loading.

3. The barium titanate foam ceramics used in the present invention form a three-dimensional and continuous whole, so the prepared composites exhibit superior dielectric properties.

4. The method for the preparing barium titanate foam ceramic/thermosetting resin composites provided in the present invention is simple and has wide applicability, so which is suitable for industrial production.

DETAILED DESCRIPTION OF THE INVENTION

The technical solution of the invention is further described by combining with the concrete drawings, embodiments and control examples as follows.

Embodiment 1

1) Preparation of Slurries 20 g of barium titanate (the average diameter is 100 nm) and 10 g of aqueous polyvinyl alcohol solution with a concentration of 10 wt % were sufficiently ground to obtain a slurry A; 5 g of aqueous carboxymethyl cellulose solution with a concentration of 2 wt % was added into the slurry A, and the mixture was sufficiently ground to obtain a slurry B; 10 g of aqueous polyacrylamide solution with a concentration of 1 wt % was added into the slurry B, and the mixture was sufficiently ground to obtain a slurry C.

2) Treatment of Polyurethane Sponge

Figure 1:
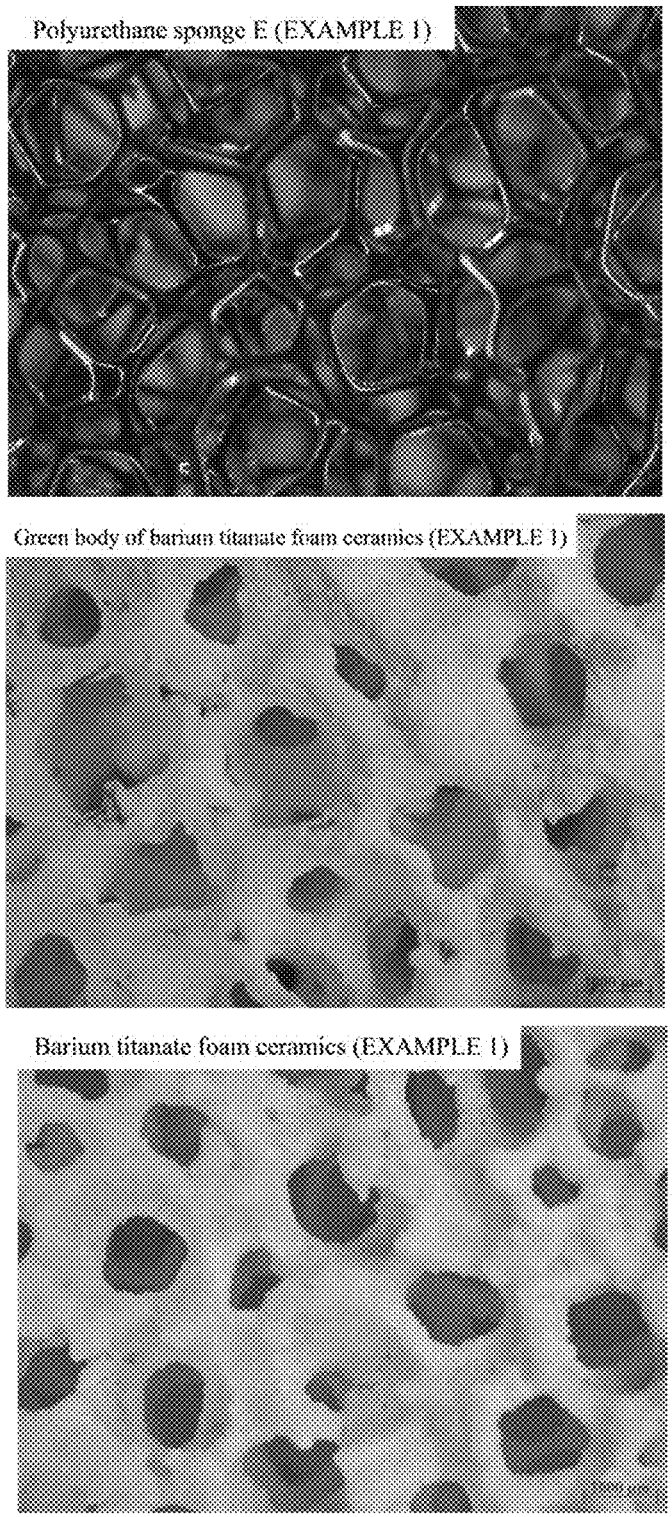
FIG. 1 is stereo microscope images of polyurethane sponge E, green body of barium titanate foam ceramics and barium titanate foam ceramics prepared in EMBODIMENT 1.

The polyurethane sponge having a specification of 25 PPI was soaked in an aqueous sodium hydroxide solution with a concentration of 15 wt %, after heated up to 60° C., and kept at that temperature for 3.5 h; the polyurethane sponge was taken out and washed with deionized water, following by drying to obtain a polyurethane sponge D; at room temperature, the polyurethane sponge D was soaked in an aqueous carboxymethyl cellulose solution with a concentration of 1 wt % for 3 h; then took out and removed the excess carboxymethyl cellulose solution, after dried at 60° C., the pretreated polyurethane sponge E was obtained. Its stereo microscope image is shown in FIG. 1.

3) Preparation of Green Body of Barium Titanate Foam Ceramics

The pretreated polyurethane sponge E was soaked in the slurry C prepared in step 1) and maintained for 5 min at room temperature, after hanging pulp; the excess slurry in the sponge was removed by extrusion, and the sponge was dried at 40° C.; repeating processes of hanging pulp and drying for 4 times, a green body of foam ceramics based on barium titanate with even coating and no blocks was obtained. Its stereo microscope image is shown in FIG. 1.

4) Preparation of Barium Titanate Foam Ceramics

Figure 2:
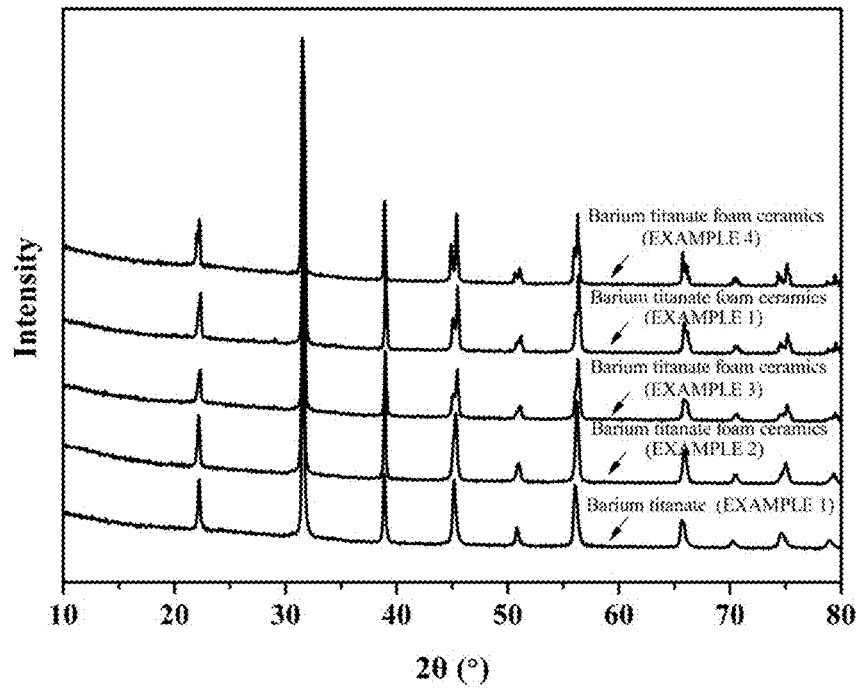
FIG. 2 is X-ray diffraction patterns of barium titanate foam ceramics prepared in EMBODIMENTS 1, 2, 3 and 4 of the present invention.

The green body of barium titanate foam ceramics prepared in step 3) was heated from room temperature to 200° C. at a rate of 2° C./min, and then raised to 600° C. at a rate of 1° C./min and maintained at 600° C. for 1 h; after that, continuously heated to 1200° C. at a rate of 5° C./min and kept at that temperature for 2 h; after the furnace was cooled to room temperature, barium titanate foam ceramics were obtained. The stereo microscope image and X-ray diffraction pattern of barium titanate foam ceramics are shown in FIGS. 1 and 2, respectively.

5) Preparation of Barium Titanate Foam Ceramic/Cyanate Ester Resin Composite

The barium titanate foam ceramics prepared in step 4) were placed in a mold and preheated at 160° C. in an oven; 2,2-Bis(4-cyanatophenyl)propane (bisphenol A cyanate ester) was melted at 160° C. for 1 h to obtain an solution, which was poured into the preheated barium titanate foam ceramics and degassed under vacuum at 160° C. for 0.5 h; followed by curing and postcuring using the procedures 160° C./2 h+180° C./2 h+200° C./2 h+220° C./2 h, and 240°

Figure 3:
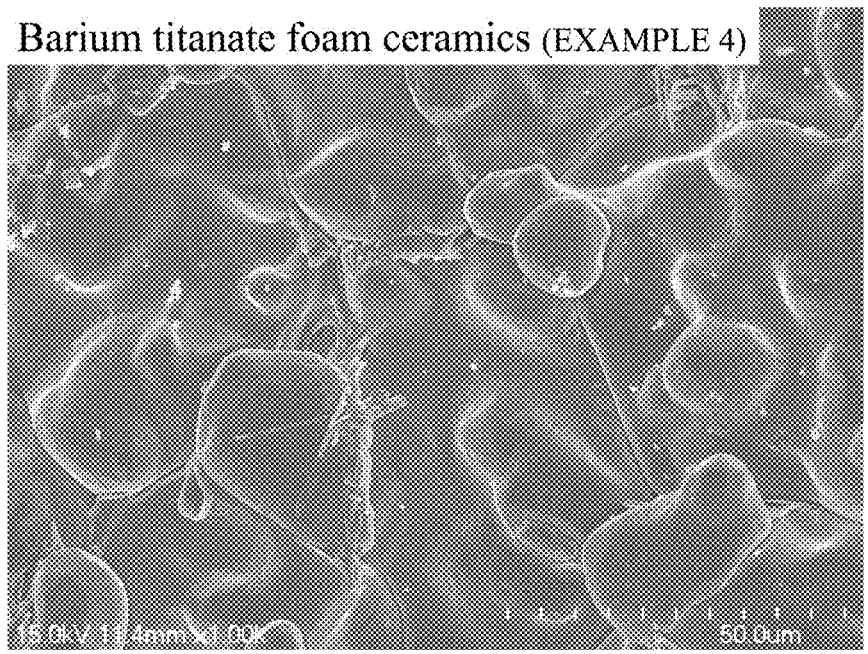
FIG. 3 is a scanning electron microscope image (×1,000) of barium titanate foam ceramics prepared in EMBODIMENT 4 in the invention.
Figure 4:
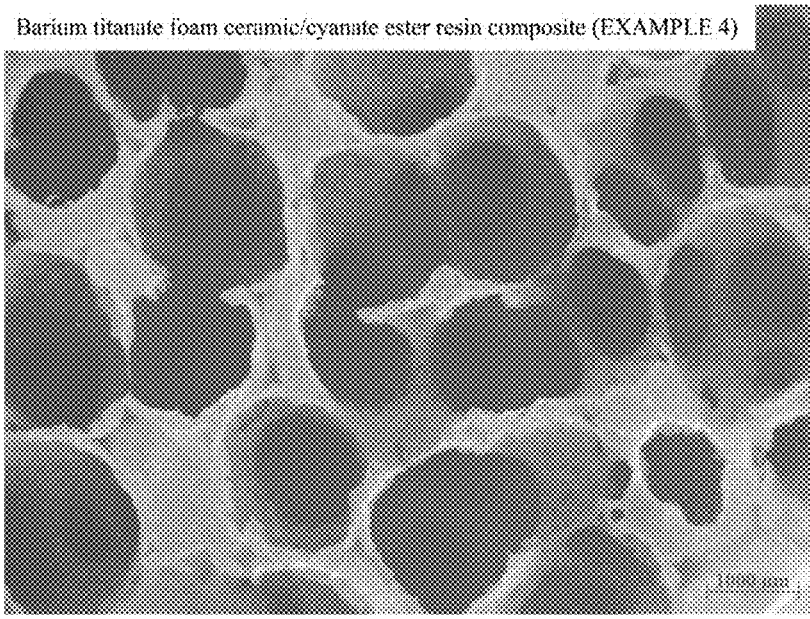
FIG. 4 is a stereo microscope image of barium titanate foam ceramic/cyanate ester resin composite prepared in EMBODIMENT 4 in the invention.

C./4 h, successively; after slowly cooled to room temperature, barium titanate foam ceramic/cyanate ester resin composite was obtained, wherein the content of cyanate ester resin is 69.2 vol %. The plots reflecting frequency dependences of dielectric content and dielectric loss of composite are shown in FIGS. 3 and 4, respectively.

FIG. 1 is stereo microscope images of polyurethane sponge E, green body of barium titanate foam ceramics and barium titanate foam ceramics prepared in EMBODIMENT 1 of the present invention. As can be seen, the pretreated polyurethane sponge E in EMBODIMENT 1 is coated with the slurry, after that, barium titanate is evenly coated on the skeleton of the sponge. After sintering, the polyurethane sponge is decomposed at high temperature to obtain barium titanate foam ceramics with even pore distribution and no blocks.

Embodiment 2

1) Preparation of Barium Titanate Foam Ceramics

The green body of barium titanate foam ceramics prepared in EMBODIMENT 1 was heated from room temperature to 200° C. at a rate of 2° C./min, and then raised to 600° C. at a rate of 1° C./min and maintained at 600° C. for 1 h; after that, continuously heated to 1000° C. at a rate of 5° C./min and kept at that temperature for 2 h; after the furnace was cooled to room temperature, barium titanate foam ceramics were obtained. Its X-ray diffraction pattern is shown in FIG. 2.

2) Preparation of Barium Titanate Foam Ceramic/Cyanate Ester Resin Composite

The barium titanate foam ceramics prepared in step 1) were placed in a mold and preheated at 160° C. in an oven; bisphenol A cyanate ester was melted at 160° C. for 1 h to obtain an solution, which was poured into the preheated barium titanate foam ceramics and degassed under vacuum at 160° C. for 0.5 h; followed by curing and postcuring using the procedures 160° C./2 h+180° C./2 h+200° C./2 h+220° C./2 h, and 240° C./4 h, successively; after slowly cooled to room temperature, barium titanate foam ceramic/cyanate ester resin composite was obtained, wherein the content of cyanate ester resin is 79.3 vol %.

Embodiment 3

1) Preparation of Barium Titanate Foam Ceramics

The green body of barium titanate foam ceramics prepared in EMBODIMENT 1 was heated from room temperature to 200° C. at a rate of 2° C./min, and then raised to 600° C. at a rate of 1° C./min and maintained at 600° C. for 1 h; after that, continuously heated to 1100° C. at a rate of 5° C./min and kept at that temperature for 2 h; after the furnace was cooled to room temperature, barium titanate foam ceramics were obtained. Its X-ray diffraction pattern is shown in FIG. 2.

2) Preparation of Barium Titanate Foam Ceramic/Cyanate Ester Resin Composite

The barium titanate foam ceramics prepared in step 1) were placed in a mold and preheated at 160° C. in an oven; Bisphenol A cyanate ester was melted at 160° C. for 1 h to obtain an solution, which was poured into the preheated barium titanate foam ceramics and degassed under vacuum at 160° C. for 0.5 h; followed by curing and postcuring using the procedures 160° C./2 h+180° C./2 h+200° C./2 h+220° C./2 h, and 240° C./4 h, successively; after slowly cooled to room temperature, barium titanate foam ceramic/cyanate ester resin composite was obtained, wherein the content of cyanate ester resin is 74.2 vol %.

Embodiment 4

1) Preparation of Barium Titanate Foam Ceramics

The green body of barium titanate foam ceramics prepared in EMBODIMENT 1 was heated from room temperature to 200° C. at a rate of 2° C./min, and then raised to 600° C. at a rate of 1° C./min and maintained at 600° C. for 1 h; after that, continuously heated to 1300° C. at a rate of 5° C./min and kept at that temperature for 2 h; after the furnace was cooled to room temperature, barium titanate foam ceramics were obtained. Its X-ray diffraction pattern and scanning electron microscope image are shown in FIGS. 2 and 3, respectively.

2) Preparation of Barium Titanate Foam Ceramic/Cyanate Ester Resin Composite

The barium titanate foam ceramics prepared in step 1) were placed in a mold and preheated at 160° C. in an oven; bisphenol A cyanate ester was melted at 160° C. for 1 h to obtain an solution, which was poured into the preheated barium titanate foam ceramics and degassed under vacuum at 160° C. for 0.5 h; followed by curing and postcuring using the procedures 160° C./2 h+180° C./2 h+200° C./2 h+220° C./2 h, and 240° C./4 h, successively; after slowly cooled to room temperature, barium titanate foam ceramic/cyanate ester resin composite was obtained, wherein the content of cyanate ester resin is 72.0 vol %. Its stereo microscope image is shown in FIG. 4.

FIG. 2 displays X-ray diffraction patterns of barium titanate foam ceramics prepared in EMBODIMENTS 1, 2, 3 and 4 of the present invention. It can be seen that nano barium titanate exhibits significant diffraction peaks at 22.1°, 31.6°, 38.9°, 45.2°, 50.8°, 56.1°, 65.8°, 70.2°, 74.6° and 78.9°, corresponding to crystal planes of (100), (110), (111), (002)/(200), (210), (211), (220), (221), (310) and (113) (JCPDS No. 5-0626), respectively. Whether 2θ at 45.2° is split into two diffraction peaks or not is an effective evidence for judging the crystalline form of barium titanate. Since the barium titanate foam ceramics prepared in EMBODIMENT 2 do not exhibit a split peak at 45.2°, it can be judged that the barium titanate foam ceramics prepared in EMBODIMENT 2 are cubic crystalloid. In contrast to EMBODIMENT 2, each pattern of the barium titanate foam ceramics prepared in EMBODIMENTS 1, 3 or 4 shows two split peaks at 45.2°, indicating that the crystalline form of the barium titanate foam ceramics transforms into tetragonal phase, and the intensity of the split peak increases obviously with the increase of sintering temperature, indicating that the content of tetragonal phase in barium titanate foam ceramics increases. Those results show that changing the sintering temperature can control the crystalline form and the content of different crystal phases of barium titanate foam ceramics. Note that there is no other impurity peak in all X-ray diffraction patterns, suggesting that organic additives have decomposed during the sintering process to obtain pure barium titanate foam ceramics with a single chemical composition.

FIG. 3 shows a scanning electron microscope image of barium titanate foam ceramics prepared in EMBODIMENT 4 of the present invention. As can be seen, after the green body of foam ceramics was sintered at high temperature, the organic additives have decomposed, the barium titanate grains grow and become larger to obtain barium titanate foam ceramics skeleton with good density.

Above results indicate that barium titanate foam ceramics with a single chemical composition and good density have been successfully prepared.

FIG. 4 is stereo microscope images of barium titanate foam ceramic/cyanate ester resin composite prepared in EMBODIMENT 1 of the present invention. It can be seen that the barium titanate foam ceramics uniformly distribute in cyanate ester resin and have good interfacial action with the resin. Results show that using barium titanate foam ceramics with three-dimensional network structure and interconnecting channels as functional fillers, after the resin is poured into the skeleton of foam ceramics, directly achieving the uniform distribution of ceramics in polymer, and simultaneously overcoming the process problem existing technology.

Embodiment 5

1) Preparation of Green Body of Barium Titanate Foam Ceramics

The pretreated polyurethane sponge E prepared in EMBODIMENT 1 was soaked in the slurry C (EMBODIMENT 1) and maintained for 5 min at room temperature; after hanging pulp, the excess slurry in the sponge was removed by extrusion, and the sponge was dried at 40° C.; repeating processes of hanging pulp and drying for 3 times, a green body of foam ceramics based on barium titanate with even coating and no blocks was obtained.

2) Preparation of Barium Titanate Foam Ceramics

The green body of barium titanate foam ceramics prepared in step 1) was heated from room temperature to 200° C. at a rate of 2° C./min, and then raised to 600° C. at a rate of 1° C./min and maintained at 600° C. for 1 h; after that, continuously heated to 1200° C. at a rate of 5° C./min and kept at that temperature for 2 h; after the furnace was cooled to room temperature, barium titanate foam ceramics were obtained.

3) Preparation of Barium Titanate Foam Ceramic/Cyanate Ester Resin Composite

Figure 5:
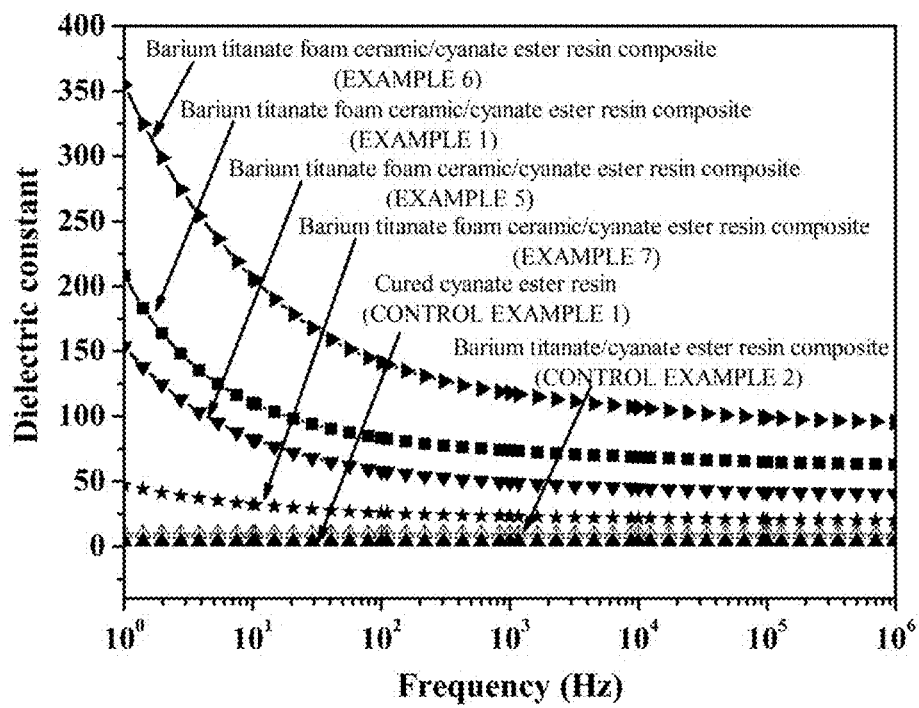
FIG. 5 is plots reflecting frequency dependence of dielectric constant of barium titanate foam ceramic/cyanate ester resin composites prepared in EMBODIMENTS 1, 2, 5 and 6, cured cyanate ester resin provided in CONTROL 1, and barium titanate/cyanate ester resin composite provided in CONTROL 2.
Figure 6:
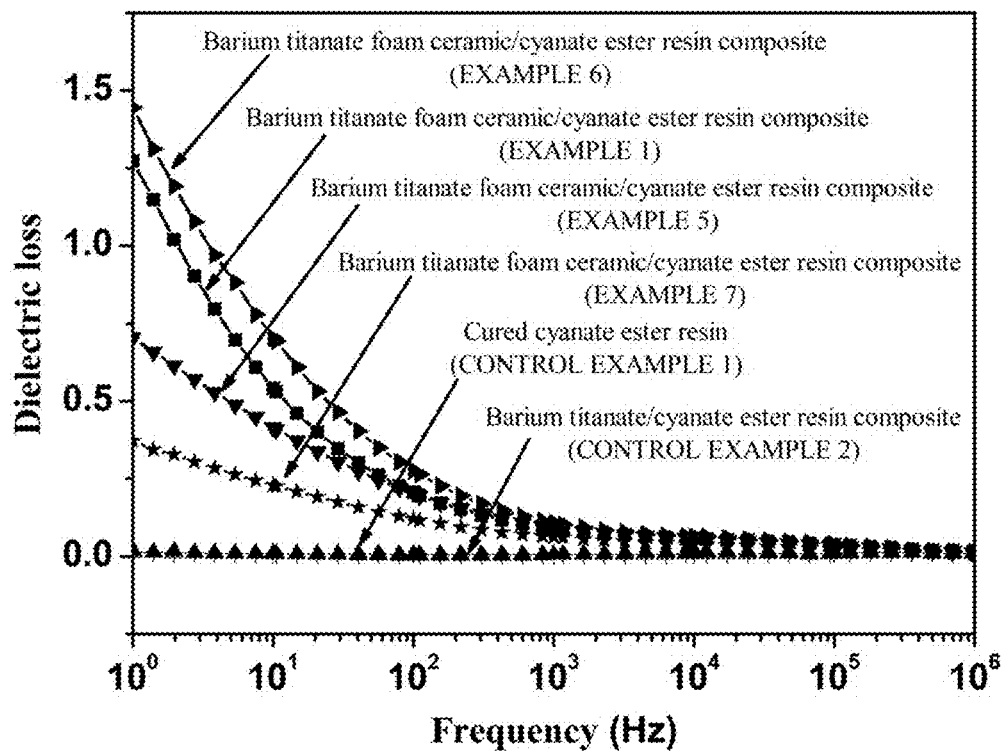
FIG. 6 gives plots reflecting frequency dependence of dielectric loss of barium titanate foam ceramic/cyanate ester resin composites prepared in EMBODIMENTS 1, 2, 5 and 6, cured cyanate ester resin provided in CONTROL 1, and barium titanate/cyanate ester resin composite provided in CONTROL 2.

The barium titanate foam ceramics prepared in step 2) were placed in a mold and preheated at 160° C. in an oven; bisphenol A cyanate ester was melted at 160° C. for 1 h to obtain an solution, which was poured into the preheated barium titanate foam ceramics and degassed under vacuum at 160° C. for 0.5 h; followed by curing and postcuring using the procedures 160° C./2 h+180° C./2 h+200° C./2 h+220° C./2 h, and 240° C./4 h, successively; after slowly cooled to room temperature, barium titanate foam ceramic/cyanate ester resin composite was obtained, wherein the content of cyanate ester resin is 76.6 vol %. The plots reflecting frequency dependences of dielectric content and dielectric loss of composite are shown in FIGS. 5 and 6, respectively.

Embodiment 6

1) Preparation of Green Body of Barium Titanate Foam Ceramics

The pretreated polyurethane sponge E prepared in EMBODIMENT 1 was soaked in the slurry C (EMBODIMENT 1) and maintained for 5 min at room temperature; after hanging pulp, the excess slurry in the sponge was removed by extrusion, and the sponge was dried at 40° C.; repeating processes of hanging pulp and drying for 5 times, a green body of foam ceramics based on barium titanate with even coating and no blocks was obtained.

2) Preparation of Barium Titanate Foam Ceramics

The green body of barium titanate foam ceramics prepared in step 1) was heated from room temperature to 200° C. at a rate of 2° C./min, and then raised to 600° C. at a rate of 1° C./min and maintained at 600° C. for 1 h; after that, continuously heated to 1200° C. at a rate of 5° C./min and kept at that temperature for 2 h; after the furnace was cooled to room temperature, barium titanate foam ceramics were obtained.

3) Preparation of Barium Titanate Foam Ceramic/Cyanate Ester Resin Composite

The barium titanate foam ceramics prepared in step 2) were placed in a mold and preheated at 160° C. in an oven; bisphenol A cyanate ester was melted at 160° C. for 1 h to obtain an solution, which was poured into the preheated barium titanate foam ceramics and degassed under vacuum at 160° C. for 0.5 h; followed by curing and postcuring using the procedures 160° C./2 h+180° C./2 h+200° C./2 h+220° C./2 h, and 240° C./4 h, successively; after slowly cooled to room temperature, barium titanate foam ceramic/cyanate ester resin composite was obtained, wherein the content of cyanate ester resin is 66.5 vol %. The frequency plots reflecting dependences of dielectric content and dielectric loss of composite are shown in FIGS. 5 and 6, respectively.

Embodiment 7

1) Preparation of Green Body of Barium Titanate Foam Ceramics

The pretreated polyurethane sponge E prepared in EMBODIMENT 1 was soaked in the slurry C (EMBODIMENT 1) and maintained for 5 min at room temperature; after hanging pulp, the excess slurry in the sponge was removed by extrusion, and the sponge was dried at 40° C.; repeating processes of hanging pulp and drying for 2 times, a green body of foam ceramics based on barium titanate with even coating and no blocks was obtained.

2) Preparation of Barium Titanate Foam Ceramics

The green body of barium titanate foam ceramics prepared in step 1) was heated from room temperature to 200° C. at a rate of 2° C./min, and then raised to 600° C. at a rate of 1° C./min and maintained at 600° C. for 1 h; after that, continuously heated to 1200° C. at a rate of 5° C./min and kept at that temperature for 2 h; after the furnace was cooled to room temperature, barium titanate foam ceramics were obtained. Its stereo microscope image is shown in FIG. 1.

3) Preparation of Barium Titanate Foam Ceramic/Cyanate Ester Resin Composite

The barium titanate foam ceramics prepared in step 2) were placed in a mold and preheated at 160° C. in an oven; bisphenol A cyanate ester was melted at 160° C. for 1 h to obtain an solution, which was poured into the preheated barium titanate foam ceramics and degassed under vacuum at 160° C. for 0.5 h; followed by curing and postcuring using the procedures 160° C./2 h+180° C./2 h+200° C./2 h+220° C./2 h, and 240° C./4 h, successively; after slowly cooled to room temperature, barium titanate foam ceramic/cyanate ester resin composite was obtained, wherein the content of cyanate ester resin is 83.5 vol %. The plots reflecting frequency dependences of dielectric content and dielectric loss of composite are shown in FIGS. 5 and 6, respectively.

CONTROL 1, Preparation of cured cyanate ester resin: a mold was preheated at 160° C. in an oven; a bisphenol A cyanate ester was melted at 160° C. for 1 h to obtain an solution, which was then poured into the preheated mold and degassed under vacuum at 160° C. for 0.5 h; followed by curing and postcuring using the procedures 160° C./2 h+180° C./2 h+200° C./2 h+220° C./2 h, and 240° C./4 h, successively; after slowly cooled to room temperature, cured cyanate ester resin was obtained. Its frequency dependences of dielectric content and dielectric loss are shown in FIGS. 5 and 6, respectively.

CONTROL 2, Preparation of barium titanate/cyanate ester resin composite: 21.3 g of barium titanate (the average diameter is 100 nm) was blended with 10 g of bisphenol A cyanate ester with stirring at 150° C. The mixture was dispersed under sonication for 10 min at 90° C. and then prepolymerization maintained at 150° C. for 0.5 h to get a prepolymer; which was poured into the preheated mold and degassed under vacuum at 160° C. for 0.5 h, followed by curing and postcuring using the procedures 160° C./2 h+180° C./2 h+200° C./2 h+220° C./2 h, and 240° C./4 h, successively, barium titanate/cyanate ester resin composite was obtained, wherein the content of cyanate ester resin is 69.2 vol %. The frequency dependences of dielectric content and dielectric loss of composite are shown in FIGS. 5 and 6, respectively.

FIG. 5 gives plots reflecting frequency dependence of dielectric constant of cured cyanate ester resin provided in CONTROL 1, barium titanate/cyanate ester resin composite provided in CONTROL 2 and barium titanate foam ceramic/ cyanate ester resin composites prepared in EMBODIMENTS 1, 2, 5 and 6. It can be seen that the dielectric constant of barium titanate foam ceramic/cyanate ester resin composite is higher than that of cured cyanate ester resin and barium titanate/cyanate ester resin composite over the whole frequency range, for EMBODIMENT, the dielectric constant (at 100 Hz) of barium titanate foam ceramic/cyanate ester resin composite prepared in EMBODIMENT 6 is 141.3, about 37 times of that of cured cyanate ester resin (3.8); for the functional fillers with equal loading, the dielectric constant of barium titanate foam ceramics/cyanate ester resin composite is higher than that of barium titanate/ cyanate ester resin composite, for EMBODIMENT, the dielectric constant (at 100 Hz) of barium titanate foam ceramics/cyanate ester resin composite prepared in EMBODIMENT 1 is 83.3, about 8.4 times of barium titanate/cyanate ester resin composite (9.9). This is because when barium titanate foam ceramics with three-dimensional network skeleton are used as functional filler, the barium titanate uniformly distributes in the composite and thus the dielectric constant of the composite is greatly improved. In addition, the more the number of coatings, the higher the dielectric constant of the composite is. Results show that the dielectric properties of the composite can be controlled by adjusting the loading of barium titanate foam ceramic skeleton; meanwhile the three-dimensional and continuously whole of barium titanate that makes the composite exhibit superior dielectric properties.

FIG. 5 shows plots reflecting frequency dependence of dielectric loss of cured cyanate ester resin provided in CONTROL 1, barium titanate/cyanate ester resin composite provided in CONTROL 2 and barium titanate foam ceramic/ cyanate ester resin composites prepared in EMBODIMENTS 1, 2, 5 and 6. It can be seen that the dielectric losses of the composites show an increased tendency as the number of coatings of the green body of barium titanate foam ceramics increases, and maintain low dielectric losses between 0.010 and 0.276 over the frequency range from $10^2$ to $10^6$ Hz.

Based on FIG. 5 and FIG. 6, it can be concluded that the barium titanate foam ceramics with a single chemical composition and high dielectric constant skeleton have significant application prospect in preparing high dielectric constant composites.

Figure 7:
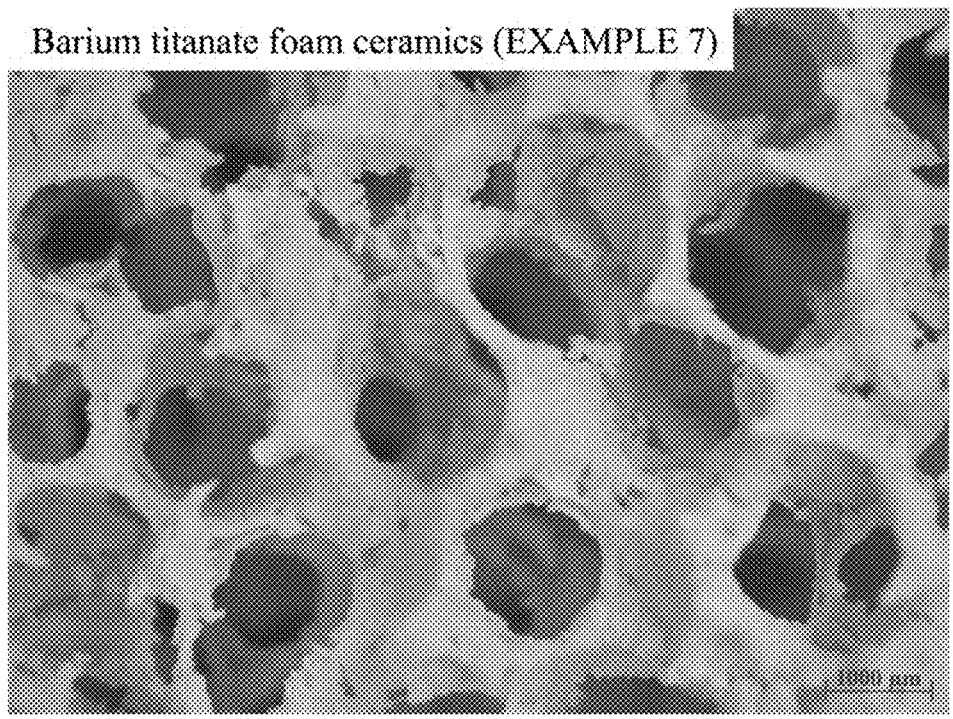
FIG. 7 is a stereo microscope image of barium titanate foam ceramics prepared in EMBODIMENT 7 in the invention.

FIG. 7 is a stereo microscope image of barium titanate foam ceramics prepared in EMBODIMENT 7. Comparing with the stereo microscope image (FIG. 1) of the barium titanate foam ceramics prepared in EMBODIMENT 1, it can be seen that the barium titanate foam ceramics prepared in EMBODIMENT 1 has a thicker skeleton, this is because the slurry in the skeleton of the sponge increases as the number of coatings increases.

Embodiment 8

1) Preparation of Barium Titanate Foam Ceramics

The green body of barium titanate foam ceramics prepared in EMBODIMENT 1 was heated from room temperature to 200° C. at a rate of 2° C./min, and then raised to 600° C. at a rate of 1° C./min and maintained at 600° C. for 2 h; after that, continuously heated to 1400° C. at a rate of 5° C./min and kept at that temperature for 2 h; after the furnace was cooled to room temperature, barium titanate foam ceramics were obtained.

2) Preparation of Barium Titanate Foam Ceramic/Bismaleimide Resin Composite

The barium titanate foam ceramics prepared in step 1) were placed in a mold and preheated at 130° C. in an oven; 2,2'-diallyl bisphenol A and N, N-4,4'-diphenylmethane bismaleimide (mass ratio of 3:7) were blended with stirring at 130° C. for 1 h to obtain an solution, which was poured into the preheated barium titanate foam ceramics and degassed under vacuum at 130° C. for 0.5 h; followed by curing and postcuring using the procedures 150° C./2 h+180° C./2 h+200° C./2 h, and 220° C./8 h, successively; after slowly cooled to room temperature, barium titanate foam ceramic/ bismaleimide resin composite was obtained.

Embodiment 9

1) Preparation of Barium Titanate Foam Ceramics

The green body of barium titanate foam ceramics prepared in EMBODIMENT 1 was heated from room temperature to 200° C. at a rate of 2° C./min, and then raised to 600° C. at a rate of 1° C./min and maintained at 600° C. for 1 h; after that, continuously heated to 1500° C. at a rate of 5° C./min and kept at that temperature for 1 h; after the furnace was cooled to room temperature, barium titanate foam ceramics were obtained.

2) Preparation of Barium Titanate Foam Ceramics/Bismaleimide/Cyanate Ester Resin Composite The barium titanate foam ceramics prepared in step 1) were placed in a mold and preheated at 140° C. in an oven; 2,2'-diallyl bisphenol A, N, N-4,4'-diphenylmethane bismaleimide and bisphenol A cyanate ester (mass ratio of 18:27: 5) were blended with stirring at 140° C. for 1 h to obtain an solution, which was poured into the preheated barium titanate foam ceramics and degassed under vacuum at 140° C. for 0.5 h; followed by curing and postcuring using the procedures 150° C./2 h+180° C./2 h+200° C./2 h, and 220° C./8 h, successively; after slowly cooled to room temperature, barium titanate foam ceramic/bismaleimide/cyanate ester resin composite was obtained.

Embodiment 10

1) Preparation of Slurries 20 g of barium titanate (the average diameter is 100 nm) and 24 g of aqueous carboxymethyl cellulose solution with a concentration of 1 wt % were sufficiently ground to obtain a slurry A; 5 g of aqueous carboxymethyl cellulose solution with a concentration of 2 wt % was added into the slurry A, and the mixture was sufficiently ground to obtain a slurry B; 16 g of aqueous polyacrylamide solution with a concentration of 0.5 wt % was added into the slurry B, and the mixture was sufficiently ground to obtain a slurry C.

2) Treatment of Polystyrene Sponge

The polystyrene sponge having a specification of 25 PPI was soaked in an aqueous sodium hydroxide solution with a concentration of 5 wt %, after heated up to 75° C., and kept at that temperature for 6 h; the polystyrene sponge was taken out and washed with deionized water, following by drying to obtain a polyurethane sponge D; at room temperature, the polystyrene sponge D was soaked in an aqueous carboxymethyl cellulose solution with a concentration of 1 wt % for 6 h; then took out and removed the excess carboxymethyl cellulose solution, after dried at 60° C., the pretreated polyurethane sponge E was obtained.

3) Preparation of Green Body of Barium Titanate Foam Ceramics

The pretreated polystyrene sponge E was soaked in the slurry C prepared in step 1) and maintained for 1 min at room temperature; after hanging pulp, the excess slurry in the sponge was removed by extrusion, and the sponge was dried at 50° C.; repeating processes of hanging pulp and drying for 1 times, a green body of foam ceramics based on barium titanate with even coating and no blocks was obtained.

4) Preparation of Barium Titanate Foam Ceramics

The green body of barium titanate foam ceramics prepared in step 3) was heated from room temperature to 200° C. at a rate of 0.5° C./min, and then raised to 600° C. at a rate of 1° C./min and maintained at 600° C. for 1 h; after that, continuously heated to 1200° C. at a rate of 5° C./min and kept at that temperature for 5 h; after the furnace was cooled to room temperature, barium titanate foam ceramics were obtained.

5) Preparation of Barium Titanate Foam Ceramic/Epoxy/Cyanate Ester Resin Composite The barium titanate foam ceramics prepared in step 4) were placed in a mold and preheated at 150° C. in an oven; epoxy (commercial name: E-51) and bisphenol A cyanate ester (mass ratio of 1:9) were blended with siring at 150° C. for 1 h to obtain an solution, which was poured into the preheated barium titanate foam ceramics and degassed under vacuum at 150° C. for 0.5 h, followed by curing and postcuring using the procedures 160° C./2 h+180° C./2 h+200° C./2 h, and 220° C./4 h, successively; after slowly cooled to room temperature, barium titanate foam ceramic/epoxy/cyanate ester resin composite was obtained.

Embodiment 11

1) Preparation of Slurries 20 g of barium titanate (the average diameter is 50 nm) and 6 g of aqueous polyvinyl alcohol solution with a concentration of 10 wt % and 18 g of aqueous carboxymethyl cellulose solution with a concentration of 1 wt % were sufficiently ground to obtain a slurry A; 5 g of aqueous carboxymethyl cellulose solution with a concentration of 0.5 wt % and 5 g of aqueous hydroxyhexyl cellulose solution with a concentration of 3 wt % were added into the slurry A, and the mixture was sufficiently ground to obtain a slurry B; 10 g of aqueous polyacrylamide solution with a concentration of 1 wt % was added into the slurry B, and the mixture was sufficiently ground to obtain a slurry C.

2) Treatment of Polyurethane Sponge

The polyurethane sponge having a specification of 25 PPI was soaked in an aqueous sodium hydroxide solution with a concentration of 20 wt %, after heated up to 50° C., and kept at that temperature for 2 h; the polyurethane sponge was taken out and washed with deionized water, following by drying to obtain a polyurethane sponge D; at room temperature, the polyurethane sponge D was soaked in an aqueous polyethyleneimine solution with a concentration of 3 wt % for 2 h; then took out and removed the excess polyethyleneimine solution, after dried at 80° C., the pretreated polyurethane sponge E was obtained.

3) Preparation of Green Body of Barium Titanate Foam Ceramics

The pretreated polyurethane sponge E was soaked in the slurry C prepared in step 1) and maintained for 10 min at room temperature; after hanging pulp, the excess slurry in the sponge was removed by extrusion, and the sponge was dried at 50° C.; repeating processes of hanging pulp and drying for 4 times, a green body of foam ceramics based on barium titanate with even coating and no blocks was obtained.

4) Preparation of Barium Titanate Foam Ceramics

The green body of barium titanate foam ceramics prepared in step 3) was heated from room temperature to 200° C. at a rate of 0.5° C./min, and then raised to 600° C. at a rate of 5° C./min and maintained at 600° C. for 0.5 h; after that, continuously heated to 1300° C. at a rate of 2° C./min and kept at that temperature for 2 h; after the furnace was cooled to room temperature, barium titanate foam ceramics were obtained.

5) Preparation of Barium Titanate Foam Ceramic/Epoxy Resin Composite

The barium titanate foam ceramics prepared in step 4) were placed in a mold and preheated at 60° C. in an oven; epoxy (commercial name: E-51) and 2-ethyl-4-methylimidazole (mass ratio of 25:1) were blended with siring at 60° C. for 0.5 h to obtain an solution, which was poured into the preheated barium titanate foam ceramics and degassed under vacuum at 60° C. for 0.5 h, followed by curing and postcuring using the procedures 80° C./2 h+100° C./2 h+120° C./2 h, and 140° C./4 h, successively; after slowly cooled to room temperature, barium titanate foam ceramic/epoxy resin composite was obtained.

Embodiment 12

1) Preparation of Slurries 20 g of barium titanate (the average diameter is 100 nm) and 6 g of aqueous methyl cellulose solution with a concentration of 15 wt % were sufficiently ground to obtain a slurry A; 16 g of aqueous carboxymethyl cellulose solution with a concentration of 0.5 wt % was added into the slurry A, and the mixture was sufficiently ground to obtain a slurry B; 10 g of aqueous polyacrylamide solution with a concentration of 0.5 wt % and 6 g of aqueous polyacrylic acid amine solution with a concentration of 0.5 wt % were added into the slurry B, and the mixture was sufficiently ground to obtain a slurry C.

2) Treatment of Polyurethane Sponge

The polyurethane sponge having a specification of 25 PPI was soaked in an aqueous sodium hydroxide solution with a concentration of 10 wt %, after heated up to 60° C., and kept at that temperature for 3.5 h; the polyurethane sponge was taken out and washed with deionized water, following by drying to obtain a polyurethane sponge D; at room temperature, the polyurethane sponge D was soaked in an aqueous polyethyleneimine solution with a concentration of 0.5 wt % for 3 h; then took out and removed the excess polyethyleneimine solution, after dried at 40° C., the pretreated polyurethane sponge E was obtained.

3) Preparation of Green Body of Barium Titanate Foam Ceramics

The pretreated polyurethane sponge E was soaked in the slurry C prepared in step 1) and maintained for 5 min at room temperature; after hanging pulp, the excess slurry in the sponge was removed by extrusion, and the sponge was dried at 80° C.; repeating processes of hanging pulp and drying for 4 times, a green body of foam ceramics based on barium titanate with even coating and no blocks was obtained.

4) Preparation of Barium Titanate Foam Ceramics

The green body of barium titanate foam ceramics prepared in step 3) was heated from room temperature to 200° C. at a rate of 5° C./min, and then raised to 600° C. at a rate of 5° C./min and maintained at 600° C. for 0.5 h; after that, continuously heated to 1000° C. at a rate of 10° C./min and kept at that temperature for 2 h; after the furnace was cooled to room temperature, barium titanate foam ceramics were obtained.

5) Preparation of Barium Titanate Foam Ceramic/Cyanate Ester Resin Composite

The barium titanate foam ceramics prepared in step 4) were placed in a mold and preheated at 160° C. in an oven; a bisphenol A cyanate ester was melted at 160° C. for 1 h to obtain an solution, which was poured into the preheated barium titanate foam ceramics and degassed under vacuum at 160° C. for 0.5 h; followed by curing and postcuring using the procedures 160° C./2 h+180° C./2 h+200° C./2 h+220° C./2 h, and 240° C./4 h, successively; after slowly cooled to room temperature, barium titanate foam ceramic/cyanate ester resin composite was obtained.

Embodiment 13

1) Preparation of Slurries 20 g of barium titanate (the average diameter is 30 nm) and 10 g of aqueous carboxymethyl cellulose solution with a concentration of 1 wt % and 10 g of aqueous methyl cellulose solution with a concentration of 1 wt % were sufficiently ground to obtain a slurry A; 2 g of aqueous carboxymethyl cellulose solution with a concentration of 2 wt % was added into the slurry A, and the mixture was sufficiently ground to obtain a slurry B; 10 g of aqueous polyacrylamide solution with a concentration of 1 wt % and 6 g of aqueous polyethyleneimine solution with a concentration of 1 wt % were added into the slurry B, and the mixture was sufficiently ground to obtain a slurry C.

2) Treatment of Polyurethane Sponge

The polyurethane sponge having a specification of 35 PPI was soaked in an aqueous sodium hydroxide solution with a concentration of 15 wt %, after heated up to 60° C., and kept at that temperature for 3.5 h, the polyurethane sponge was taken out and washed with deionized water, following by drying to obtain a polyurethane sponge D; at room temperature, the polyurethane sponge D was soaked in a mixed solution by equal volume of aqueous carboxymethyl cellulose solution with concentration of 1 wt % and aqueous polyethyleneimine solution with concentration of 1 wt % for 3 h; then took out and removed the excess mixed solution of carboxymethyl cellulose solution and polyethyleneimine solution, after dried at 60° C., the pretreated polyurethane sponge E was obtained.

3) Preparation of Green Body of Barium Titanate Foam Ceramics

The pretreated polyurethane sponge E was soaked in the slurry C prepared in step 1) and maintained for 10 min at room temperature; after hanging pulp, the excess slurry in the sponge was removed by extrusion, and the sponge was dried at 50° C.; repeating processes of hanging pulp and drying for 4 times, a green body of foam ceramics based on barium titanate with even coating and no blocks was obtained.

4) Preparation of Barium Titanate Foam Ceramics

The green body of barium titanate foam ceramics prepared in step 3) was heated from room temperature to 200° C. at a rate of 2° C./min, and then raised to 600° C. at a rate of 1° C./min and maintained at 600° C. for 1 h; after that, continuously heated to 1000° C. at a rate of 2° C./min and kept at that temperature for 1 h; after the furnace was cooled to room temperature, barium titanate foam ceramics were obtained.

5) Preparation of Barium Titanate Foam Ceramic/Bismaleimide Resin Composite

The barium titanate foam ceramics prepared in step 4) were placed in a mold and preheated at 130° C. in an oven; 2,2'-diallyl bisphenol A and N,N-4,4'-diphenylmethane bismaleimide (mass ratio of 3:7) were blended with stirring at 130° C. for 1 h to obtain an solution, which was poured into the preheated barium titanate foam ceramics and degassed under vacuum at 130° C. for 0.5 h; followed by curing and postcuring using the procedures 150° C./2 h+180° C./2 h+200° C./2 h, and 220° C./8 h, successively; after slowly cooled to room temperature, barium titanate foam ceramic/bismaleimide resin composite was obtained.

Embodiment 14

1) Preparation of Slurries 20 g of barium titanate (the average diameter is 50 nm) and 6 g of aqueous polyvinyl alcohol solution with a concentration of 10 wt % and 10 g of aqueous carboxymethyl cellulose solution with a concentration of 1 wt % were sufficiently ground to obtain a slurry A; 5 g of aqueous carboxymethyl cellulose solution with a concentration of 2 wt % was added into the slurry A, and the mixture was sufficiently ground to obtain a slurry B; 5 g of aqueous polyacrylamide solution with a concentration of 1 wt % and 5 g of aqueous polyethyleneimine solution with a concentration of 1 wt % were added into the slurry B, and the mixture was sufficiently ground to obtain a slurry C.

2) Treatment of Polyvinyl Chloride Sponge

The polyvinyl chloride sponge having a specification of 15 PPI was soaked in an aqueous sodium hydroxide solution with a concentration of 20 wt %, after heated up to 60° C., and kept at that temperature for 2 h; the polyvinyl chloride sponge was taken out and washed with deionized water, following by drying to obtain a polyvinyl chloride D; at room temperature, the polyurethane sponge D was soaked in an aqueous carboxymethyl cellulose solution with concentration of 0.5 wt % for 3 h; then took out and removed the excess carboxymethyl cellulose solution, after dried at 60° C., the pretreated polyvinyl chloride sponge E was obtained.

3) Preparation of Green Body of Barium Titanate Foam Ceramics

The pretreated polyvinyl chloride sponge E was soaked in the slurry C prepared in step 1) and maintained for 5 min at room temperature; after hanging pulp, the excess slurry in the sponge was removed by extrusion, and the sponge was dried at 80° C.; repeating processes of hanging pulp and drying for 4 times, a green body of foam ceramics based on barium titanate with even coating and no blocks was obtained.

4) Preparation of Barium Titanate Foam Ceramics

The green body of barium titanate foam ceramics prepared in step 3) was heated from room temperature to 200° C. at a rate of 0.5° C./min, and then raised to 600° C. at a rate of 5° C./min and maintained at 600° C. for 2 h; after that, continuously heated to 1200° C. at a rate of 5° C./min and kept at that temperature for 2 h; after the furnace was cooled to room temperature, barium titanate foam ceramics were obtained.

5) Preparation of Barium Titanate Foam Ceramic/Bismaleimide/Cyanate Ester Resin Composite The barium titanate foam ceramics prepared in step 4) were placed in a mold and preheated at 140° C. in an oven; 2,2'-diallyl bisphenol A, N, N-4,4'-diphenylmethane bismaleimide and bisphenol A cyanate ester (mass ratio of 18:27:5) were blended with stirring at 140° C. for 1 h to obtain an solution, which was poured into the preheated barium titanate foam ceramics and degassed under vacuum at 140° C. for 0.5 h; followed by curing and postcuring using the procedures 150° C./2 h+180° C./2 h+200° C./2 h, and 220° C./8 h, successively; after slowly cooled to room temperature, barium titanate foam ceramic/bismaleimide/cyanate ester resin composite was obtained.

Embodiment 15

1) Preparation of Slurries 20 g of barium titanate (the average diameter is 30 nm) and 24 g of aqueous carboxymethyl cellulose solution with a concentration of 1 wt % were sufficiently ground to obtain a slurry A; 2 g of aqueous hydroxyhexyl cellulose solution with a concentration of 3 wt % was added into the slurry A, and the mixture was sufficiently ground to obtain a slurry B; 16 g of aqueous polyethyleneimine solution with a concentration of 0.5 wt % was added into the slurry B, and the mixture was sufficiently ground to obtain a slurry C.

2) Treatment of Polystyrene Sponge

The polystyrene sponge having a specification of 25 PPI was soaked in an aqueous sodium hydroxide solution with a concentration of 5 wt %, after heated up to 75° C., and kept at that temperature for 6 h; the polystyrene sponge was taken out and washed with deionized water, following by drying to obtain a polystyrene sponge D; at room temperature, the polystyrene sponge D was soaked in an aqueous polyethyleneimine solution with concentration of 3 wt % for 2 h; then took out and removed the excess polyethyleneimine solution, after dried at 60° C., the pretreated polystyrene sponge E was obtained.

3) Preparation of Green Body of Barium Titanate Foam Ceramics

The pretreated polystyrene sponge E was soaked in the slurry C prepared in step 1) and maintained for 10 min at room temperature; after hanging pulp, the excess slurry in the sponge was removed by extrusion, and the sponge was dried at 50° C.; repeating processes of hanging pulp and drying for 7 times, a green body of foam ceramics based on barium titanate with even coating and no blocks was obtained.

4) Preparation of Barium Titanate Foam Ceramics The green body of barium titanate foam ceramics prepared in step 3) was heated from room temperature to 200° C. at a rate of 0.5° C./min, and then raised to 600° C. at a rate of 5° C./min and maintained at 600° C. for 2 h; after that, continuously heated to 1000° C. at a rate of 10° C./min and kept at that temperature for 5 h; after the furnace was cooled to room temperature, barium titanate foam ceramics were obtained.

5) Preparation of Barium Titanate Foam Ceramic/Epoxy/Cyanate Ester Resin Composite The barium titanate foam ceramics prepared in step 4) were placed in a mold and preheated at 150° C. in an oven; epoxy (commercial name: E-51) and bisphenol A cyanate ester (mass ratio of 1:9) were blended with siring at 150° C. for 1 h to obtain an solution, which was poured into the preheated barium titanate foam ceramics and degassed under vacuum at 150° C. for 0.5 h; followed by curing and postcuring using the procedures 160° C./2 h+180° C./2 h+200° C./2 h, and 220° C./4 h, successively; after slowly cooled to room temperature, barium titanate foam ceramic/epoxy/cyanate ester resin composite was obtained.

Embodiment 16

1) Preparation of Slurries 20 g of barium titanate (the average diameter is 50 nm) and 6 g of aqueous polyvinyl alcohol solution with a concentration of 15 wt % were sufficiently ground to obtain a slurry A; 16 g of aqueous hydroxyhexyl cellulose solution with a concentration of 0.5 wt % was added into the slurry A, and the mixture was sufficiently ground to obtain a slurry B; 4 g of aqueous polyacrylic acid amine solution with a concentration of 3 wt % was added into the slurry B, and the mixture was sufficiently ground to obtain a slurry C.

2) Treatment of Polyvinyl Chloride Sponge

The polyvinyl chloride sponge having a specification of 25 PPI was soaked in an aqueous sodium hydroxide solution with a concentration of 20 wt %, after heated up to 50° C., and kept at that temperature for 2 h; the polyvinyl chloride sponge was taken out and washed with deionized water, following by drying to obtain a polyvinyl chloride sponge D; at room temperature, the polyvinyl chloride sponge D was soaked in an aqueous polyethyleneimine solution with concentration of 0.5 wt % for 2 h; then took out and removed the excess polyethyleneimine solution, after dried at 80° C., the pretreated polyvinyl chloride sponge E was obtained.

3) Preparation of Green Body of Barium Titanate Foam Ceramics

The pretreated polyvinyl chloride sponge E was soaked in the slurry C prepared in step 1) and maintained for 1 min at room temperature; after hanging pulp, the excess slurry in the sponge was removed by extrusion, and the sponge was dried at 80° C.; repeating processes of hanging pulp and drying for 1 times, a green body of foam ceramics based on barium titanate with even coating and no blocks was obtained.

4) Preparation of Barium Titanate Foam Ceramics

The green body of barium titanate foam ceramics prepared in step 3) was heated from room temperature to 100° C. at a rate of 5° C./min, and then raised to 500° C. at a rate of 0.5° C./min and maintained at 500° C. for 0.5 h; after that, continuously heated to 1500° C. at a rate of 10° C./min and kept at that temperature for 2 h; after the furnace was cooled to room temperature, barium titanate foam ceramics were obtained.

5) Preparation of Barium Titanate Foam Ceramic/Epoxy Resin Composite

The barium titanate foam ceramics prepared in step 4) were placed in a mold and preheated at 60° C. in an oven; epoxy (commercial name: E-51) and 2-ethyl-4-methylimidazole (mass ratio of 25:1) were blended with siring at 60° C. for 0.5 h to obtain an solution, which was poured into the preheated barium titanate foam ceramics and degassed under vacuum at 60° C. for 0.5 h; followed by curing and postcuring using the procedures 80° C./2 h+100° C./2 h+120° C./2 h, and 140° C./4 h, successively; after slowly cooled to room temperature, barium titanate foam ceramic/epoxy resin composite was obtained.

Embodiment 17

1) Preparation of Slurries 20 g of barium titanate (the average diameter is 100 nm) and 15 g of aqueous polyvinyl alcohol solution with a concentration of 10 wt % were sufficiently ground to obtain a slurry A; 10 g of aqueous carboxymethyl cellulose solution with a concentration of 1 wt % was added into the slurry A, and the mixture was sufficiently ground to obtain a slurry B; 5 g of aqueous polyacrylic acid amine solution with a concentration of 2 wt % was added into the slurry B, and the mixture was sufficiently ground to obtain a slurry C.

2) Treatment of Polyurethane Sponge

The polyurethane sponge having a specification of 25 PPI was soaked in an aqueous sodium hydroxide solution with a concentration of 15 wt %, after heated up to 60° C., and kept at that temperature for 3.5 h; the polyurethane sponge was taken out and washed with deionized water, following by drying to obtain a polyurethane sponge D; at room temperature, the polystyrene sponge D was soaked in an aqueous polyethyleneimine solution with concentration of 0.5 wt % for 6 h; then took out and removed the excess polyethyleneimine solution, after dried at 60° C., the pretreated polyurethane sponge E was obtained.

3) Preparation of Green Body of Barium Titanate Foam Ceramics

The pretreated polyurethane sponge E was soaked in the slurry C prepared in step 1) and maintained for 5 min at room temperature; after hanging pulp, the excess slurry in the sponge was removed by extrusion, and the sponge was dried at 40° C.; repeating processes of hanging pulp and drying for 7 times, a green body of foam ceramics based on barium titanate with even coating and no blocks was obtained.

4) Preparation of Barium Titanate Foam Ceramics

The green body of barium titanate foam ceramics prepared in step 3) was heated from room temperature to 300° C. at a rate of 2° C./min, and then raised to 700° C. at a rate of 2° C./min and maintained at 700° C. for 2 h; after that, continuously heated to 1200° C. at a rate of 8° C./min and kept at that temperature for 3 h; after the furnace was cooled to room temperature, barium titanate foam ceramics were obtained.

5) Preparation of Barium Titanate Foam Ceramic/Cyanate Ester Resin Composite

The barium titanate foam ceramics prepared in step 1) were placed in a mold and preheated at 160° C. in an oven; a bisphenol A cyanate ester melted at 160° C. for 1 h to obtain an solution, which was poured into the preheated barium titanate foam ceramics and degassed under vacuum at 160° C. for 0.5 h; followed by curing and postcuring using the procedures 160° C./2 h+180° C./2 h+200° C./2 h+220° C./2 h, and 240° C./4 h, successively; after slowly cooled to room temperature, barium titanate foam ceramic/cyanate ester resin composite was obtained.

What we claim:

1. A preparation method of barium titanate foam ceramic/thermosetting resin composites, comprising the following steps:

(1) by weight, 100 parts of nano barium titanate and 30 to 120 parts of an aqueous solution of organic binder with a concentration of 1 to 15 wt % are sufficiently ground to obtain a slurry A; 10 to 80 parts of an aqueous solution of organic rheological agent with a concentration of 0.5 to 3 wt % are added into the slurry A, and the mixture is sufficiently ground to obtain a slurry B; 20 to 80 parts of an aqueous solution of organic dispersant with a concentration of 0.5 to 3 wt % are added into the slurry B, and the mixture is sufficiently ground to obtain a slurry C; said organic binder is one or more selected from polyvinyl alcohol, carboxymethyl cellulose and methyl cellulose; said organic rheological agent is one or more selected from carboxymethyl cellulose and hydroxyhexyl cellulose; said organic dispersant is one or more selected from polyacrylamide, polyethyleneimine and polyacrylic acid amine;

(2) a polymer sponge having a specification of 15 to 35 PPI is soaked in an aqueous solution of sodium hydroxide with a concentration of 5 to 20 wt %, after heated up to 50 to 75° C., and kept at that temperature for 2 to 6 h, the polymer sponge is taken out and washed with deionized water, following by drying to obtain a polymer sponge D; at room temperature, the polymer sponge D is soaked in an aqueous surfactant solution with a concentration of 0.5 to 3 wt % for 2 to 6 h, then took out and removed the excess surfactant, after dried at 40 to 80° C., a pretreated polymer sponge E is obtained; the polymer of said polymer sponge is selected from polyurethane, polystyrene, or polyvinyl chloride; said surfactant is one or more selected from carboxymethyl cellulose and polyethyleneimine;

(3) the pretreated polymer sponge E is soaked in the slurry C prepared in step (1), and maintained for 1 to 10 min at room temperature, the excess slurry in the sponge is removed by extrusion, and the sponge is dried at 40 to 80° C.; repeating processes and drying for 1 to 7 times, a green body of barium titanate foam ceramics is obtained;

(4) the green body of barium titanate foam ceramics prepared in step (3) is heated from room temperature to 100-300° C. at a rate of 0.5-5° C./min, and then raised to 500-700° C. at a rate of 0.5-5° C./min and maintained at 500-700° C. for 0.5-2 h, after that, continuously heated to 1000-1500° C. at a rate of 2-10° C./min and kept at 1000-1500° C. for 1-5 h, after the furnace is cooled to room temperature, barium titanate foam ceramics is obtained;

(5) after preheating the titanate foam ceramics prepare in step (4) at 160° C. in a mold, a molten and thermocurable resin is poured into the preheated barium titanate foam ceramics, after the pores of foam ceramic are fully permeated with the resin, by thermocuring and postprocessing, a barium titanate foam ceramic/thermosetting resin composite is obtained.

2. The preparation method of barium titanate foam ceramic/thermosetting resin composites according to claim 1, wherein the average diameter of said nano barium titanate is less than or equal to 100 nm.

3. The preparation method of barium titanate foam ceramic/thermosetting resin composites according to claim 1, wherein the process conditions of thermocuring and postprocessing are consistent with the process conditions of thermocuring and postprocessing of the thermocurable resin being used.

4. The preparation method of barium titanate foam ceramic/thermosetting resin composites according to claim 1, wherein said thermosetting resin is a resin which can be self-cured by heat, or a resin system composed of curing agent and resin which cannot be self-cured by heat.

5. The preparation method of barium titanate foam ceramic/thermosetting resin composites according to claim 4, wherein said resin which can be self-cured by heat is one or more selected from bismaleimide resin and cyanate ester resin.

6. The preparation method of barium titanate foam ceramic/thermosetting resin composites according to claim 4, wherein said resin which cannot be self-cured by heat is epoxy resin.

* * * * *